United States Patent
Son et al.

(10) Patent No.: US 8,486,164 B2
(45) Date of Patent: Jul. 16, 2013

(54) EVAPORATOR AND FUEL REFORMER HAVING THE SAME

(75) Inventors: In-Hyuk Son, Suwon-si (KR); Woo-Cheol Shin, Suwon-si (KR); Jin-Goo Ahn, Suwon-si (KR); Sung-Chul Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 612 days.

(21) Appl. No.: 12/420,777

(22) Filed: Apr. 8, 2009

(65) Prior Publication Data

US 2010/0062299 A1 Mar. 11, 2010

Related U.S. Application Data

(60) Provisional application No. 61/094,807, filed on Sep. 5, 2008.

(51) Int. Cl.
*F28D 1/06* (2006.01)

(52) U.S. Cl.
USPC .................................. 48/61; 165/132; 159/22

(58) Field of Classification Search
USPC ..... 48/61–118.5, 127.1, 127.9, 197 R–197 A; 422/129–242; 429/400–535
See application file for complete search history.

(56) References Cited

U.S. PATENT DOCUMENTS

| | | |
|---|---|---|
| 6,617,067 B1 | 9/2003 | Tachihara et al. |
| 2003/0049184 A1 | 3/2003 | Kimata et al. |
| 2003/0190504 A1* | 10/2003 | Fisher et al. .................. 429/17 |
| 2004/0258971 A1* | 12/2004 | Gyoten et al. ................. 429/26 |
| 2006/0234095 A1 | 10/2006 | Kong et al. |
| 2007/0054162 A1* | 3/2007 | Miyamoto et al. ............ 429/15 |
| 2007/0077186 A1* | 4/2007 | Gil et al. ...................... 422/189 |
| 2007/0154367 A1 | 7/2007 | Jang et al. |

FOREIGN PATENT DOCUMENTS

| | | |
|---|---|---|
| DE | 100 54 920 A1 | 6/2001 |
| DE | 102 42 020 A1 | 3/2003 |
| EP | 1 712 274 A | 10/2006 |
| JP | 2001-0135331 | 5/2001 |
| JP | 2001-0135332 | 5/2001 |
| JP | 2001-0135333 | 5/2001 |
| JP | 2001-0135334 | 5/2001 |
| JP | 2001-0135335 | 5/2001 |
| JP | 2003-0089502 | 3/2003 |
| JP | 2005-0522846 | 7/2005 |
| JP | 2005-324088 | 11/2005 |
| JP | 2005-344947 | 12/2005 |
| JP | 2006-290737 | 10/2006 |

(Continued)

OTHER PUBLICATIONS

KIPO Office action dated Aug. 17, 2010, for priority Korean Patent application 10-2008-0125752.
European Search Report dated Aug. 20, 2010, for corresponding European Patent application 09169167.5, noting German reference DE 102 42 020.

(Continued)

*Primary Examiner* — Imran Akram
(74) *Attorney, Agent, or Firm* — Christie, Parker & Hale, LLP

(57) ABSTRACT

An evaporator and a fuel reformer having the same. The evaporator includes a wall arrangement having a circumferential wall and a bottom wall, the circumferential wall and the bottom wall defining (or surrounding) an evaporation chamber; an inlet provided at one side of the evaporation chamber; an outlet formed in the bottom wall; and a barrier at (or surrounding) the outlet and projected from the bottom wall to the inside of the evaporation chamber.

13 Claims, 5 Drawing Sheets

FOREIGN PATENT DOCUMENTS

| | | |
|---|---|---|
| JP | 2007-099616 | 4/2007 |
| JP | 2007-109651 | 4/2007 |
| KR | 10-2006-0108376 | 10/2006 |
| KR | 10-0674863 B1 | 1/2007 |
| KR | 10-0691365 B1 | 2/2007 |
| KR | 10-2007-0070456 | 7/2007 |
| WO | WO 2007/145218 A1 | 12/2007 |

OTHER PUBLICATIONS

European Search Report dated Feb. 8, 2010, for corresponding European Patent application 09169167.5.

Japanese Office action dated Jul. 31, 2012, for corresponding Japanese Patent application 2009-205178, (3 pages).

* cited by examiner

EVAPORATOR AND FUEL REFORMER HAVING THE SAME

CROSS-REFERENCE TO RELATED APPLICATIONS

This application claims priority to and the benefit of U.S. Provisional Patent Application No. 61/094,807, filed on Sep. 5, 2008, the entire content of which is incorporated herein by reference.

BACKGROUND

1. Field of the Invention

The present invention relates to an evaporator and a fuel reformer including the same.

2. Discussion of Related Art

A fuel reformer is an apparatus which reforms fuel and generates hydrogen rich gas. This fuel reformer can be used with a fuel cell (which is a clean power generating apparatus that can directly generate electric energy by an electrochemical reaction of hydrogen and oxygen), etc.

The fuel reformer generally includes a heat source and a reforming reactor. The heat source supplies necessary heat to the reforming reactor, and the reforming reactor reforms fuel and generates hydrogen rich gas. The reforming reactor can generate the hydrogen rich gas using a stream reforming scheme, an auto-thermal reforming scheme, a partial oxidation scheme, or a combination thereof.

Also, the fuel reformer can further include an evaporator to improve fuel efficiency and apparatus performance. In this case, the evaporator evaporates a liquid-phase fuel flowing into the evaporator from the outside, and supplies it (that is, a gas-phase fluid evaporated from the liquid-phase fuel) to the reforming reactor.

That is, when a liquid-phase fuel or water flows into the reforming reactor using the stream reforming scheme, the performance of the fuel reformer is significantly reduced due to a non-uniform reforming reaction. In other words, since the volume of the liquid-phase water is increased to 22.4L per 1 cc by vaporization, when the liquid-phase water flows into the reforming reactor, the stream reforming reaction is non-uniform, such that the generated gas is pulsated. In order to reduce or prevent this problem, an existing evaporator includes a relatively long channel as compared to the volume of the fuel reformer so as to evaporate the liquid-phase fuel and water flowing in from the outside.

Therefore, the existing evaporator has a large volume due to the long channel structure. Also, in the case of a small evaporator, the evaporator has a complicated structure due to the long channel structure, such that it is difficult to manufacture. In addition, the fuel reformer having a large volume has a long warm-up time.

SUMMARY OF THE INVENTION

An aspect of an embodiment of the present invention is directed toward an evaporator capable of reducing (or preventing) discharge of liquid-phase fluid, uniformly controlling a discharge amount of gas-phase fluid, and/or being formed in a small size.

Another aspect of an embodiment of the present invention is directed toward a fuel reformer including the evaporator capable of reducing (or preventing) discharge of liquid-phase fluid, uniformly controlling a discharge amount of gas-phase fluid, and/or being formed in a small size.

An embodiment of the present invention provides an evaporator of a fuel reformer. The evaporator includes a circumferential wall, a bottom wall, an evaporation chamber, and a barrier. The bottom wall has an outlet extending through the bottom wall. The evaporation chamber is for receiving a liquid-phase fluid, and is defined by the circumferential wall and the bottom wall. The barrier is configured to extend out from the bottom wall and into the evaporation chamber, and is for blocking the liquid-phase fluid from being discharged through the outlet while allowing a gas-phase fluid to be discharged through the outlet.

In one embodiment of the evaporator, the barrier is at a periphery of the outlet.

In one embodiment of the evaporator, the bottom wall is separated from the circumferential wall by a first distance in a first direction, and the barrier extends out of the bottom wall by a second distance in the first direction, the second distance being less than the first distance. Here, the second distance may be between about 25% and about 75% of the first distance.

In one embodiment of the evaporator, the evaporation chamber includes a first-stage evaporation chamber and a second-stage evaporation chamber. Here, the evaporator may also include a middle wall between the bottom wall and the circumferential wall, the middle wall separating the first-stage evaporation chamber from the second stage evaporation chamber and having a passage extending through the middle wall. The evaporator may also include another barrier extending from the middle wall and into the first-stage evaporation chamber. The bottom wall may be separated from the middle wall by a first distance in a first direction, and the barrier may extend out of the bottom wall by a second distance in the first direction, the second distance being less than the first distance. In addition, the evaporator may further include a heat source for supplying heat to vaporize fluid in at least one of the first-stage evaporation chamber or the second-stage evaporation chamber.

In one embodiment of the evaporator, the barrier is composed of an identical material as that of the bottom wall.

In one embodiment of the evaporator, the barrier is composed of a different material from that of the bottom wall.

In one embodiment of the evaporator, the barrier is a liquid blocking sill for blocking the liquid-phase fluid from flowing from a first region of the bottom wall to a second region of the bottom wall, the outlet being at the second region of the bottom wall.

In one embodiment of the evaporator, the barrier is a pipe penetrated into the outlet and extending out from the bottom wall toward the circumferential wall. The evaporator may further include a mesh at an input or output end of the pipe. Here, the mesh may have a mesh size between about 200 cells per square inch (cpsi) and about 1000 cpsi.

Another embodiment of the present invention provides a fuel reformer. The reformer includes a reforming reactor, an evaporator, and a heat source. The evaporator is for vaporizing a fuel and water into a gas-phase fluid and supplying the gas-phase fluid to the reforming reactor. The heat source is stacked between the evaporator and the reforming reactor and for supplying heat to both the evaporator and the reforming reactor. Here, the evaporator includes an evaporation chamber and a barrier. The evaporation chamber is for containing a liquid-phase fluid, and is defined by a bottom wall, the bottom wall being between the evaporation chamber and oxidation reactor and having an opening extending through the bottom wall. The barrier is configured to extend out from the bottom wall and into the evaporation chamber and for blocking the liquid-phase fluid from being discharged through the opening while allowing the gas-phase fluid to be discharged through the opening.

In one embodiment of the fuel reformer, the heat source includes an oxidation reactor.

In one embodiment of the fuel reformer, the evaporation chamber has a meandering shaped channel extended between an inlet at one side of the evaporation chamber for supplying the fuel and water into the evaporation chamber and the opening at another side of the evaporation chamber.

In one embodiment, the fuel reformer further includes a distributor for distributing air to the oxidation reactor and stacked between the oxidation reactor and the evaporator.

In one embodiment, the fuel reformer further includes a cover. Here, the bottom wall is separated from the cover by a first distance in a first direction, and the barrier extends out of the bottom wall by a second distance in the first direction, the second distance being less than the first distance.

In one embodiment of the fuel reformer, the barrier is a pipe penetrated into the opening and extending out from the bottom wall and into the evaporation chamber, and the pipe includes a jaw projected onto a surface of the bottom wall facing the evaporation chamber to support the pipe with the surface of the bottom wall.

In one embodiment of the fuel reformer, the bottom wall has a plurality of openings, and a plurality of barriers are respectively at peripheries of the plurality of openings.

In one embodiment of the fuel reformer, the evaporator, the heat source, and the reforming reactor are respectively composed of first, second, and third plates stacked together as a stack of reacting plates.

A more complete understanding the evaporator and the fuel reformer having the same will be afforded to those skilled in the art, by a consideration of the following detailed description. Reference will be made to the appended sheets of drawings, which will first be described briefly.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
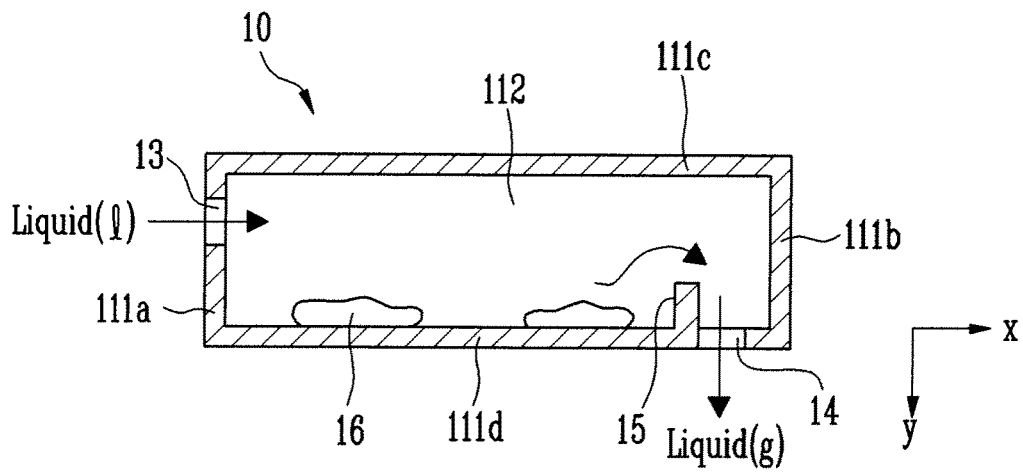
FIG. 1 is a cross-sectional schematic view of an evaporator according to a first embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

In the following description, the term, "gas-phase" refers to a state of fluid in which molecules freely move due to a distance interval and a weak bonding force therebetween so that the fluid does not have a set (or predetermined) form and volume and tends to fill a container. Gas-phase fluid has smaller density than a liquid-phase or solid-phase fluid, and can easily change its volume due to an increase or decrease of pressure. Also, the gas-phase fluid can be easily compressed or heat-expanded.

FIG. 1 is a cross-sectional schematic view of an evaporator 10 according to a first embodiment of the present invention.

Referring to FIG. 1, the evaporator includes an evaporation chamber 112 formed by a wall arrangement. Among the walls of the wall arrangement forming the evaporation chamber 112, one wall positioned at a lower side of the evaporation chamber 112 in a gravity direction (y direction) is referred to as a bottom wall 111$d$, and the other walls other than the bottom wall 111$d$ are referred to as circumferential walls 111$a$, 111$b$, and 111$c$. Further, the evaporator 10 includes an inlet 13 formed in the circumferential wall 111$a$ and an outlet 14 formed in the bottom wall 111$d$.

Liquid-phase fluid having a set (or predetermined) pressure flows through the inlet 13 from the outside, and most of this liquid-phase fluid is vaporized in the evaporation chamber 112 to be discharged through the outlet 14. Here, gas-phase fluid may flow through the inlet 13 together with the liquid-phase fluid. The fluid may, for example, be water, fuel, or a mixture of water and fuel. Further, the fuel may, for example, be liquefied petroleum gas (LPG), petroleum, methanol, ethanol, bio mass, etc.

In the present embodiment, some of the liquid-phase fluids 16 are not vaporized and remain in the evaporation chamber 112, but they are blocked from being discharged through the outlet 14 by a barrier 15.

The barrier 15 is for blocking (or preventing) non-vaporized liquid-phase fluid 16 from flowing out from the evaporation chamber 112 to the outside. The barrier 15 of the present embodiment is formed to be integrated with the bottom wall 111$d$. The barrier 15 is projected from (or extended out of) the bottom wall 111$d$. That is, the barrier 15 is extended out of the bottom surface of the evaporation chamber 112, to the inward space thereof and forms a sill (or wall) at the outlet 14 with a set (or predetermined) height extending from the bottom surface of the evaporation chamber 112 and into the evaporation chamber 112.

In more detail and as shown in FIG. 1, the evaporation chamber 112 is for receiving a liquid-phase fluid 16, and is defined by the circumferential wall 111$c$ and the bottom wall 111$d$. The barrier 15 is composed of a liquid blocking sill (or blocking wall) extending out from the bottom wall 111$d$ and into the evaporation chamber 112, and is for blocking the liquid-phase fluid 16 from being discharged through the outlet 14 while allowing a gas-phase fluid to be discharged though the outlet 14. Here, the liquid blocking sill is for blocking the liquid-phase fluid 16 from flowing from a first region of the bottom wall 111d to a second region of the bottom wall 111d, the outlet 14 being at the second region of the bottom wall 111d.

Figure 2:
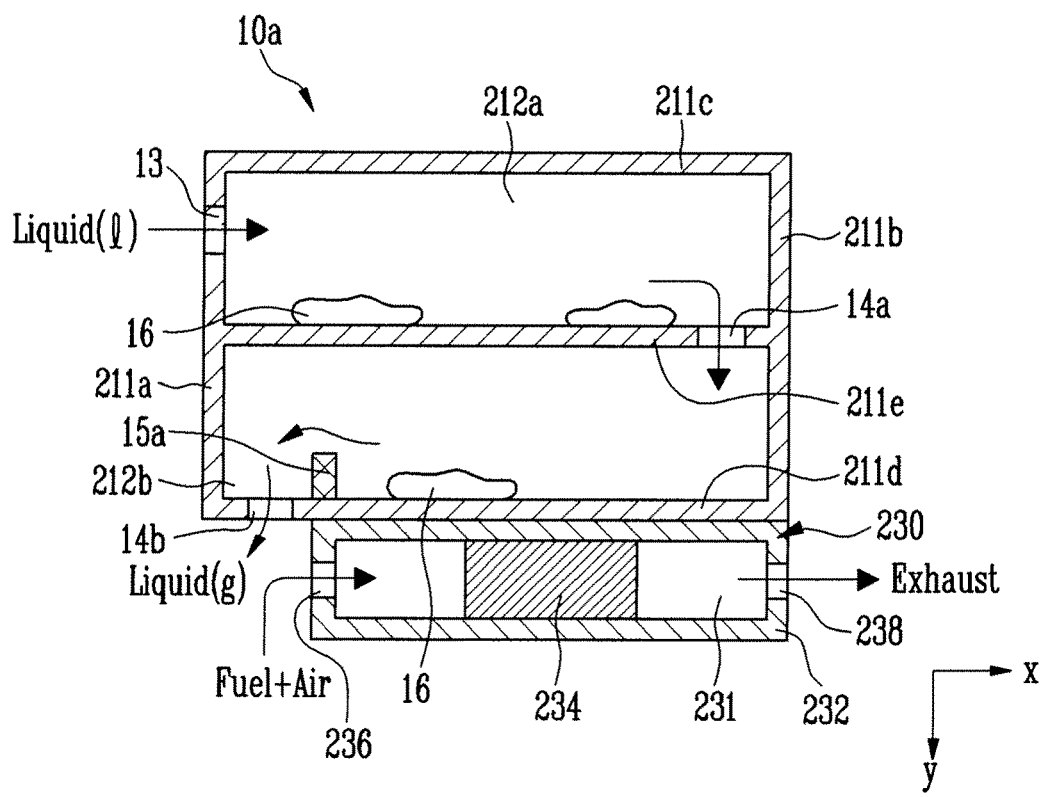
FIG. 2 is a cross-sectional schematic view of an evaporator according to a second embodiment of the present invention.

FIG. 2 is a cross-sectional schematic view of an evaporator 10a according to a second embodiment of the present invention.

Referring to FIG. 2, the evaporator 10a includes a two-stage evaporation chamber structure having a longer flow field than the evaporator 10 of FIG. 1 such that the liquid-phase 16 fluid flowing in from the outside is sufficiently heat-exchanged to be discharged in a vaporized state. The two-stage structure of the evaporation chamber is one example, and the present invention is not thereby limited. That is, for example, the evaporator 10a of the present embodiment may have an at least three-stage evaporation chamber structure.

Among the walls forming the two-stage evaporation chamber structure, a wall positioned at a lower side of a first-stage evaporation chamber 212a in a gravity direction (y direction) is referred to as a middle wall 211e, and another wall positioned at a lower side of a second-stage evaporation chamber 212b is referred to as a bottom wall 211d. The other walls other than the middle wall 211e and the bottom wall 211d are referred to as circumferential walls 211a, 211b, and 211c.

Also, the evaporator 10a includes an inlet 13 formed in the circumferential wall 211a at one side of the evaporator 10a, a passage 14a formed in the middle wall 211e, and an outlet 14b formed in the bottom wall 211d.

Also, the evaporator 10a may include a heat source 230 coupled to the outer surface of the bottom wall 211d.

The heat source 230 supplies heat necessary for vaporizing fluid in the evaporation chambers 212a and 21b. The heat source 230 includes a body 232 forming a combustion chamber 231 and an oxidation catalyst 234 provided in the combustion chamber 231. One side of the body 232 may be provided with an inlet 236 to introduce the fuel and air and another side of the body 232 may be provided with an outlet 238 to discharge the fuel and air.

Some of the liquid-phase fluids flowing into the first-stage evaporation chamber 212a from the outside at a set (or predetermined) pressure are vaporized in the first-stage evaporation chamber 212a. The vaporized fluid and some of the liquid-phase fluids are supplied (or moved) into the second-stage evaporation chamber 212b through the passage 14a. Some liquid-phase fluids are vaporized in the second-stage evaporation chamber 212b. And then, the vaporized fluids are discharged through the outlet 14b. Here, some liquid-phase fluids 16 are not vaporized and remain in the second-stage evaporation chamber 212b, but they are blocked from flowing through the outlet 14b by a barrier 15a.

In the present embodiment, the barrier 15a forms a sill (or wall) at the outlet 14b, the sill having a set (or predetermined) height extending from the bottom surface of the second-stage evaporation chamber 212b and into the second-stage evaporation chamber 212b, such that liquid-phase fluid existing in the second-stage evaporation chamber 212b is not discharged through the outlet 14b. Here, in one embodiment, the barrier 15a may separately be made of the same material as the wall arrangement or a different material from the wall arrangement and can be fixed to one surface of the bottom wall 211d.

Furthermore, in the present embodiment, another barrier 15b can be provided on the middle wall 211e of the evaporator 10a. In this case, the another barrier 15b forms a wall having a predetermined height between the one surface of the middle wall 211e and the passage 14a, such that liquid-phase fluid existing in the first-stage evaporation chamber 212a is not discharged through the passage 14a.

In the evaporator 10a of the present embodiment, the outflow of the gas-phase fluid is uniform, and the discharge of the liquid-phase fluid can be blocked (or prevented). Therefore, on the basis of the same outflow, the evaporator of the present embodiment can have a smaller volume than the existing evaporator. Also, the back pressure of the evaporator can be lowered to be between about ½ and about ⅔ due to the reduction of the volume, such that the power consumption of a fluid supplying apparatus, such as a pump, for supplying liquid-phase fluid to the evaporator can be lowered.

As an example, the existing evaporator may include an evaporator having a multi-stage disk structure used for a reformer in a stream reforming scheme. This kind of evaporator has a chamber structure with a volume of at least 200 cc or more and at least eight stages so as to obtain a desired heat efficiency and performance. Here, it is assumed that as one of the desired performance, the flow rate of hydrogen gas generated from the reformer with the existing evaporator is about 5 [cc/min]. The volume of the existing evaporator is relatively large as compared to the volume of the evaporator of the present embodiment. Therefore, when the existing evaporator is preheated, the heating area is large, so its warm-up time is long and its back pressure is high. For example, the back pressure of the existing evaporator may be between about 10 and about 20 kPa.

However, the discharge of the liquid-phase fluid is reduced (or prevented) in the evaporator of the present embodiment, thereby making it possible to substantially reduce the volume of the evaporator and to improve the performance of the evaporator. For example, the existing evaporator with the eight-stage chamber structure may be changed to an evaporator having a six-stage or four-stage chamber structure. In other words, the evaporator of the present embodiment can have the same performance as compared to the foregoing existing evaporator, but the volume of the evaporator of the present embodiment is reduced, for example, from about 200 cc to about 100 cc and the back pressure of the evaporator is lowered, for example, from between about 10 and about 20 kPa to between about 5 and about 8 kPa, thereby improving the efficiency and performance of a fuel reformer including the evaporator of the present embodiment. Also, vaporization characteristics of introduced water are improved so that mixing the water with fuel (for example, LPG) introduced to the reforming reactor can be further uniformly conducted. For example, a ratio of steam/carbon is lowered from 4 or more to 3 or less, thereby further improving the efficiency and performance of the fuel reformer.

Figure 3:
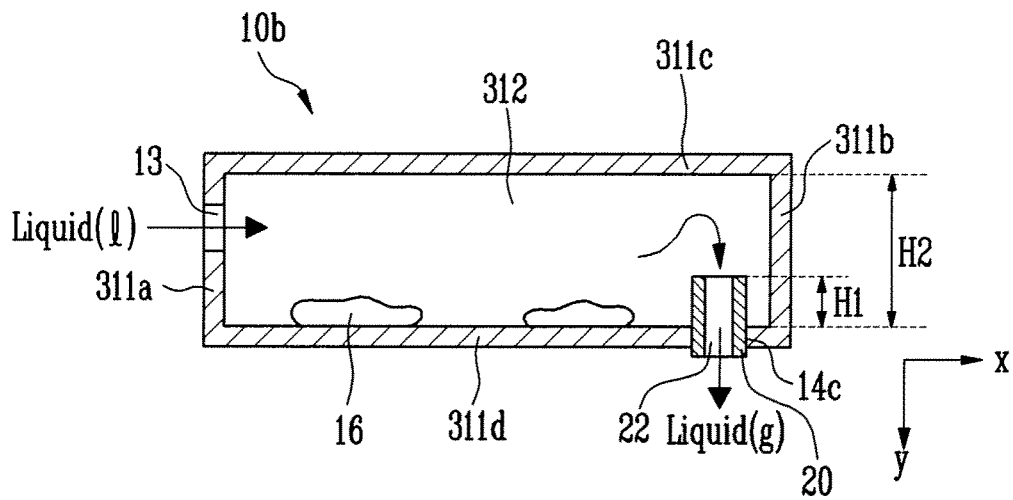
FIG. 3 is a cross-sectional schematic view of an evaporator according to a third embodiment of the present invention.

FIG. 3 is a cross-sectional schematic view of an evaporator 10b according to a third embodiment of the present invention.

Referring to FIG. 3, the evaporator 10b includes an evaporation chamber 312 formed by a wall arrangement. Among the walls of the wall arrangement forming an evaporation chamber 312, a wall positioned at a lower side of an evaporation chamber 312 in a gravity direction (y direction) is referred to as a bottom wall 311d and the other walls other than the bottom wall 311d are referred to as circumferential walls 311a, 311b, and 311c. Also, the evaporator 10b includes an inlet 13 formed in the circumferential wall 311a and an opening part 14c formed in the bottom wall 311d.

Also, the evaporator 10b includes a barrier 20 inserted into the opening part 14c such that it is projected with a set (or predetermined) height from the bottom wall 311d (that is, the bottom surface of the evaporation chamber 312) to the inside of the evaporation chamber 312. The barrier 20 may be formed by a pipe (or hollow pipe) having a set (or predetermined) length with a hollow part 22 serving as an outlet of the evaporation chamber 312.

In the present embodiment, most of the liquid-phase fluids flowing through the inlet 13 are vaporized by heat supplied from an outside heat source in the evaporation chamber 312 to be discharged through the outlet. Here, some of the liquid-phase fluids having flowed through the inlet 13 may not be vaporized and stay in the evaporation chamber 312. However, in the present embodiment, most of the liquid-phase fluids 16 staying in the evaporation chamber 312 are blocked from being discharged to the outside by the barrier 20 forming a wall (or pipe wall) at the opening part 14c, the wall having a set (or predetermined) height extending from the bottom surface of the evaporation chamber 312 and into the evaporation chamber 312.

The projection height H1 of the barrier 20 is configured (or designed) to be between about 25% and about 75% of a distance (or height) H2 between the bottom wall 311d and the upper circumferential wall 311c. Herein, the projection height H1 of the barrier 20 indicates the height from the bottom wall 311d to the inside of the evaporation chamber 312. In one embodiment, when the projection height H1 of the barrier 20 is less than about 25%, a significant amount of the liquid-phase fluid 16 existing on the bottom surface of the evaporation chamber 312 can go beyond the projection height H1 of the barrier and be discharged to the hollow part 22. In another embodiment, when the projection height H1 of the barrier 20 is larger than about 75%, the power consumption of a fluid supplying apparatus for supplying liquid-phase fluids from the outside is significantly increased due to the increase of pressure in the evaporation chamber 312. Here, the fluid supplying apparatus may include a liquid pump, etc.

Figure 4A:
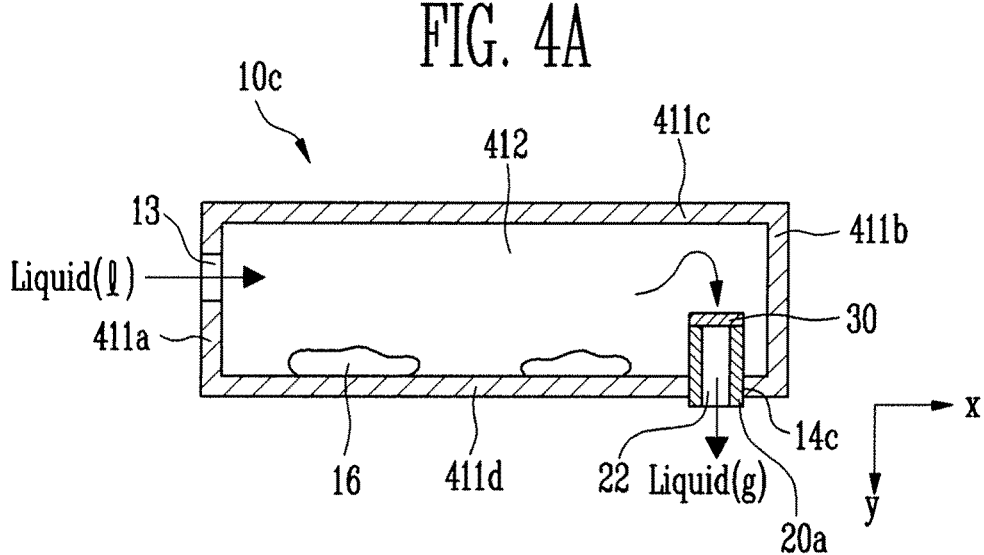
FIG. 4A is a cross-sectional schematic view of an evaporator according to a fourth embodiment of the present invention.
Figure 4B:
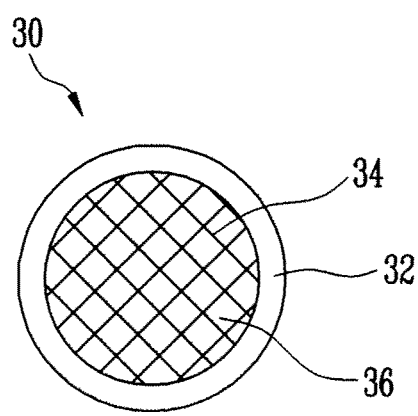
FIG. 4B is a plan schematic view of certain components of the evaporator of FIG. 4A.

FIG. 4A is a cross-sectional schematic view of an evaporator 10c according to a fourth embodiment of the present invention. FIG. 4B is a plan schematic view of certain components of the evaporator 10c of FIG. 4A.

Referring to FIG. 4A, the evaporator 10c includes an evaporation chamber 412 formed by a wall arrangement and a barrier 20a projected from a bottom wall 411d of the wall arrangement to the inside of the evaporation chamber 412. Another wall of the wall arrangement is provided with an inlet 13.

The wall arrangement includes the bottom wall 411d positioned at a lower side of the evaporation chamber 412 in a gravity direction (y direction) and the other circumferential walls 411, 411b, and 411c. The bottom wall 411d is provided with an opening part 14c.

The barrier 20a penetrates through the opening part 14c and has one end projected with a set (or predetermined) height from one surface of the bottom wall 411d (that is, from the bottom surface of the evaporation chamber 412) to the inside of the evaporation chamber 412. The barrier 20a may be formed of a hollow pipe having a set (or predetermined) length with a hollow part 22 of the barrier 20a serving as an outlet of the evaporation chamber 412. With the aforementioned structure, the barrier 20a blocks the discharge of some of the liquid-phase fluids 16 in the evaporation chamber 412 to the outside.

In the present embodiment, one end of the barrier 20a (that is, the end positioned in the evaporation chamber 412) is provided with a mesh 30. As shown in FIG. 4B, the mesh 30 is installed to discharge only fluid having a less than set (or predetermined) size of evaporated liquid-phase fluid through the hollow part 22. The mesh member 30 may be made by at least one of stainless steel, ceramic based composite materials, ceramic based layer structures, or the combination thereof. The mesh 30 may include a frame 32 in a ring shape and a net structure 34 provided in a space inside the frame 32.

Here, in one embodiment, the mesh 30 having a plurality of cells 36 of the mesh 30 is configured (or designed) to have a mesh size between about 200 cells per square inch (cpsi) and about 1000 cpsi. In one embodiment, when the mesh size of the mesh member 30 is below 200 cpsi, the effect of the mesh member 30 is insignificant. In another embodiment, when the mesh size exceeds 1000 cpsi, the back pressure in the evaporation chamber 412 is increased to deteriorate the efficiency and performance of the evaporator 10c.

Figure 5:
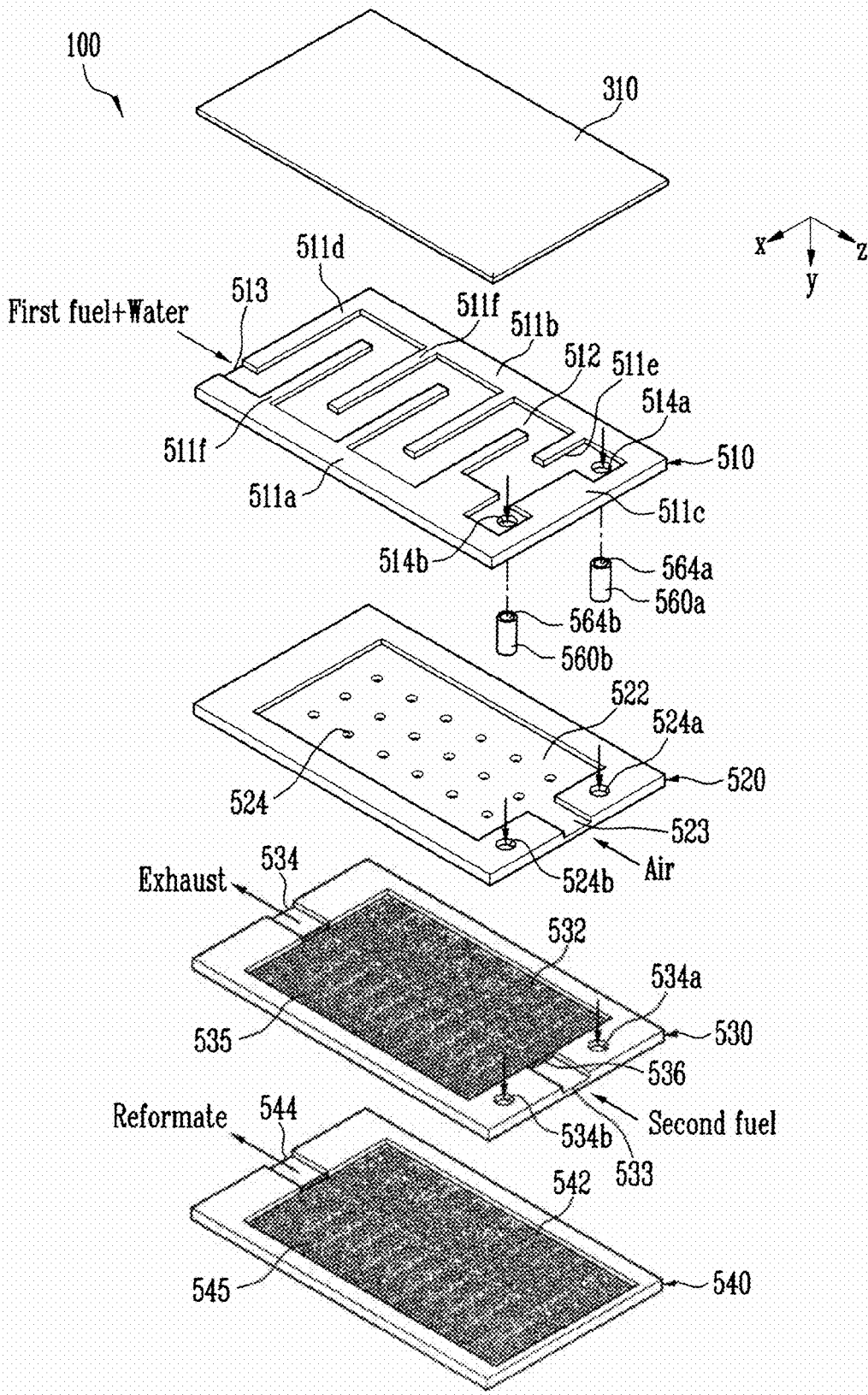
FIG. 5 is an exploded perspective schematic view of a fuel reformer according to an embodiment of the present invention.
Figure 6:
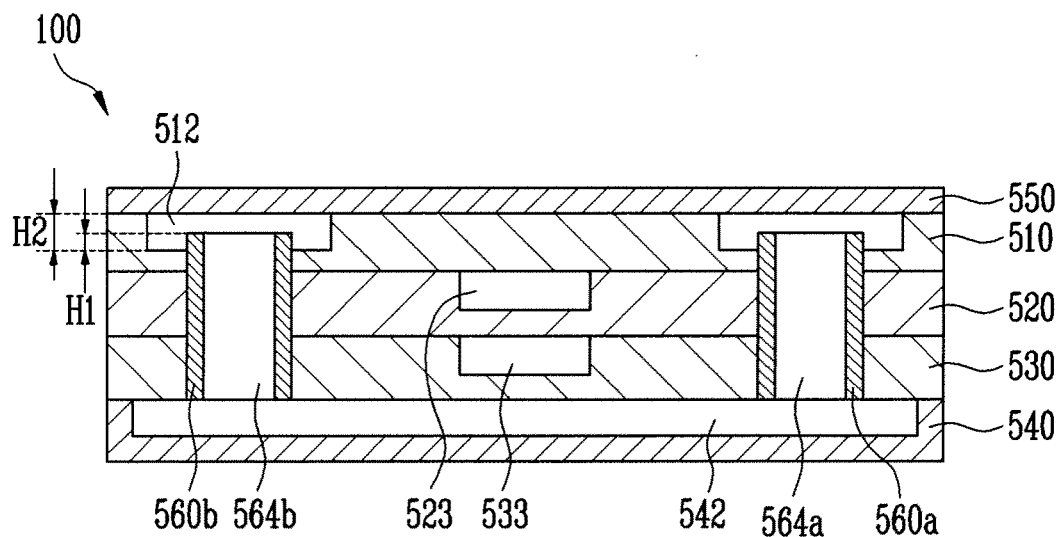
FIG. 6 is a horizontal cross-sectional schematic view of the fuel reformer of FIG. 5 in a stacked state.

FIG. 5 is an exploded perspective schematic view of a fuel reformer 100 according to an embodiment of the present invention, and FIG. 6 is a horizontal cross-sectional schematic view of the fuel reformer 100 of FIG. 5 in the stacked state.

Referring to FIG. 5, the fuel reformer 100 includes an evaporator 510, a distributor 520, an oxidation reactor 530, a reforming reactor 540, a cover 550, and two barriers 560a and 560b. The evaporator 510 includes a structure and shape similar to the structure and shape of the evaporator of the foregoing embodiment of FIG. 3. The fuel reformer 100 of the present embodiment can be used as an apparatus for supplying a uniform inflow of hydrogen to an anode of a fuel cell.

More specifically, the evaporator 510 vaporizes first fuel and water flowing in at a set (or predetermined) pressure from the outside and supplies it to the reforming reactor 540. The evaporator 510 includes an evaporation chamber 512 defined by a wall arrangement formed on one surface of a first plate in a flat shape. The wall arrangement includes a bottom wall 511e forming the bottom surface of the evaporation chamber 512 and circumferential walls 511a, 511b, 511c, 511d, and 511f forming side walls of the evaporation chamber 51. A cover plate 550 in a flat shape is stacked on one surface of the first plate to cover one surface of the evaporation chamber 512.

A set of circumferential walls 511f among the foregoing circumferential walls are formed with a set (or predetermined) pattern. For example, the circumferential walls 511f are formed to be alternately extended by a set (or predetermined) length from a first pair of circumferential walls 511a and 511b facing each other, thereby forming a shape in which two combs are clasped to each other. The evaporation chamber 512 includes an inner space having a meandering (or serpentine) shape between the first pair of circumferential walls 511a and 511b facing each other and a second pair of circumferential walls 511c and 511d facing each other.

One end portion of the inner space of the evaporation chamber 512 positioned near the circumferential wall 511c is divided into two so that the gas-phase first fuel and/or vapor can efficiently move to the reforming reactor 540 when the liquid-phase first fuel and/or water is vaporized to increase the volume thereof.

Also, the evaporator 510 includes an inlet 513 provided in one side of the evaporation chamber 512 and two opening parts 514a and 514b provided in another side of the evaporation chamber 512. The inlet 513 is provided in a form where a portion of the circumferential wall 511d is removed. The two opening parts 514a and 514b are formed in the bottom wall 511e to be adjacent to the circumferential wall 511c.

To put it another way, the evaporation chamber 512 as shown in FIG. 5 has the meandering (or serpentine) shape with the inlet 513 at one side of the evaporation chamber 512 for supplying the fuel and water into the evaporation chamber 512 and the openings 514a and 514b provided at another side of the evaporation chamber 512.

The distributor 520 and the oxidation reactor 530 form a heat source interposed between the evaporator 510 and the reforming reactor 540, and the heat source supplies heat to the evaporator 510 and the reforming reactor 540.

The distributor 520 substantially uniformly distributes air from the outside over the entire inner space of the oxidation reactor 530. The distributor 520 includes a distribution chamber 522 concavely formed on one surface of a second plate in a flat shape, an inlet 523 provided in one side of the distribution chamber 522, a plurality of distribution holes 524 formed in the bottom surface of the distribution chamber 522, and two opening parts 524a and 524b penetrating through the second plate independently from the distribution chamber 522.

The two opening parts 524a and 524b are installed to correspond to the two opening parts 514a and 514b provided in the evaporation chamber 512 of the first plate. The second plate is stacked on another surface of the first plate to cover one surface of the distribution chamber 522 by the another surface of the first plate.

The oxidation reactor 530 combusts second fuel and generates reaction heat by the combustion reaction. The oxidation reactor 530 includes a combustion chamber 532 concavely formed on one surface of a third plate in a flat shape, an inlet 533 provided in one side of the combustion chamber 532, an outlet 534 provided in another side of the combustion chamber 532, an oxidation catalyst 535 provided inside the combustion chamber 532, and two opening parts 534a and 534b penetrating through the third plate independently from the combustion chamber 532.

The two opening parts 534a and 534b are installed to correspond to the opening parts 524a and 524b provided in the second plate. The third plate is stacked on another surface of the second plate to cover the one surface of the combustion chamber 532 by the another side of the second plate.

A catalyst in a granule shape can be used as the oxidation catalyst 535. In this case, in order to reduce (or prevent) scattering of the oxidation catalyst 535 in a granule form, the inlet 533 and outlet 534 of the combustion chamber 532 may be provided with a net member 536.

The second fuel introduced to the combustion chamber 532 is combusted by reacting with air on the surface of the oxidation catalyst 535. Here, air is distributed over the entire area of the combustion chamber 532 by the plurality of distribution holes 524. With this configuration, when the combustion reaction of exothermic reaction occurs in a considerably rapid manner in the combustion chamber 532, the generation of local hot spots can be reduced or prevented. Further, reaction heat can uniformly be supplied to the evaporator 510 and the reforming reactor 540 by the uniform combustion reaction.

The reforming reactor 540 reforms the first fuel by the stream reforming reaction to generate hydrogen and discharges the generated hydrogen. The reforming reactor 540 includes a reforming chamber 542 concavely formed on one surface of a fourth plate in a flat shape, an outlet 544 provided in one side of the reforming chamber 542, and a reforming catalyst 545 provided in the reforming chamber 542. The fourth plate is stacked on another surface of the third plate to cover the one side of the reforming plate 542 by the another surface of the third plate. As the reforming catalyst 545, a catalyst in a granule shape can be used.

In order to allow the evaporation chamber 512 to fluidly communicate with the reforming chamber 542, each of a first barrier 560a and a second barrier 560b may be formed of a hollow pipe having a set (or predetermined) length. The first barrier 560a includes a first hollow part 564a, and the second barrier 560b includes a second hollow part 564b.

The first barrier 560a is inserted into the first opening part 514a of the first plate, the first opening part 524a of the second plate, and the first opening part 534a of the third plate. The second barrier 560b is inserted into the second opening unit 514b of the first plate, the second opening part 524b of the second plate, and the second opening part 534b of the third plate.

One end portions of the first barrier 560a and the second barrier 560b (that is, the portions positioned at the evaporation chamber 512) are projected by a set (or predetermined) length from the bottom surface of the evaporation chamber 512 to the inside of the evaporation chamber 512. The projection heights H1 of the first barrier 560a and the second barrier 560b are between about 25% and about 75% of the inner height H2 of the corresponding portion of the evaporation chamber 512 as shown in FIG. 6. The projection structure of the barriers 560a and 560b blocks (or interrupts) the flow of the liquid-phase first fuel or water to the reforming reactor 540.

Figure 7:
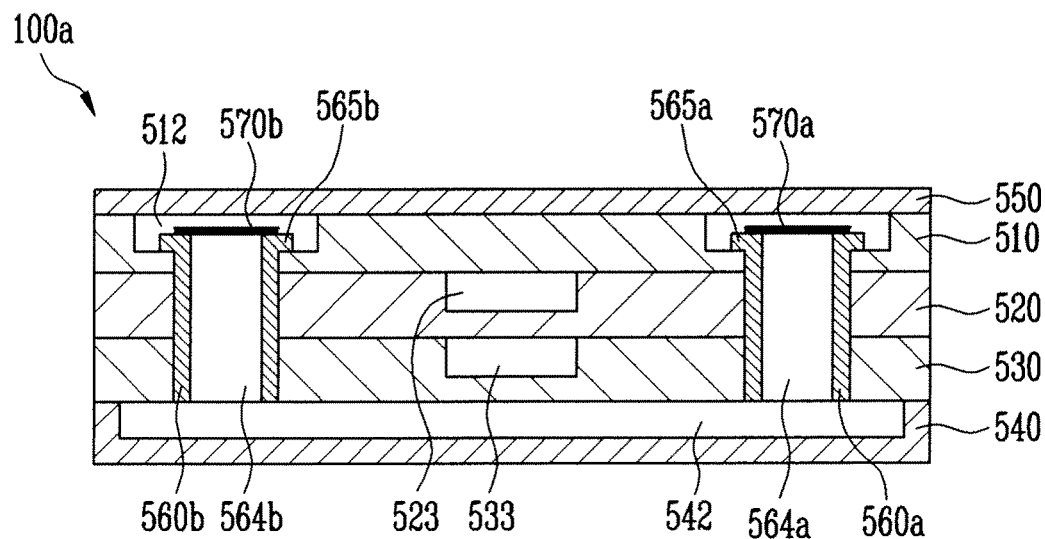
FIG. 7 is a horizontal cross-sectional schematic view of a fuel reformer according to another embodiment of the present invention.

Also, a fuel reformer 100a in another embodiment of the present invention may further include mesh members 570a and 570b each provided at ends of the first barrier 560a and the second barrier 560b as shown in FIG. 7. In this case, each of the mesh members 570a and 570b may be similar to the mesh member of FIG. 4B.

Also, in the fuel reformer 100a, one end of the first barrier 560a and one end of the second barrier 560b may respectively be provided with jaws (or jaw parts) 565a and 565b. Each of the jaws 565a and 565b is in a slightly extended form from the outer surface of the hollow pipe in a radial direction. The respective jaw parts 565a and 565b are for supporting first and second barriers 560a and 560b with the bottom surface of the evaporation chamber 512 in a state where the ends of the first barrier 560a and the second barrier 560b are projected by a set (or predetermined) length on the bottom surface of the evaporation chamber 512.

The cover plate 550, the first plate 510, the second plate 520, the third plate 530, and the fourth plate 540 can be assembled in a structure where corner portions thereof are bonded by a weld (or can be assembled by welding). Here, gaskets having a proper shape can also be installed between the respective plates.

As such, the evaporator 510, the heat source 530, and the reforming reactor (540) respectively include the first, second, and third plates 510, 520, and 530 stacked together as a stack of reacting plates to form the reformer 100 or 100a.

Figure 8:
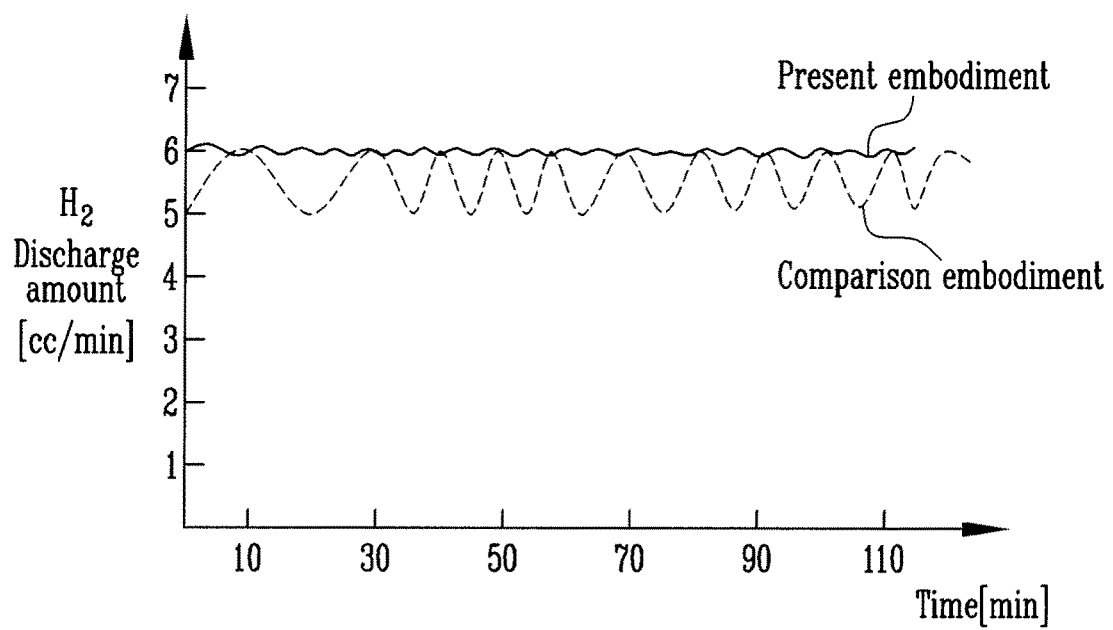
FIG. 8 is a graph showing a hydrogen discharge amount of a fuel reformer according to an embodiment of the present invention and a comparative example.

FIG. 8 is a graph showing a hydrogen discharge amount of a fuel reformer according to an embodiment of the present invention (present embodiment) and a comparative example (comparison embodiment).

As shown in FIG. 8, the fuel reformer of the present embodiment substantially generates hydrogen in a uniform manner of about 6 cc/min while maintaining a pulsation (or influx deviation) of reformate to about ±0.2 L/min. This is a considerably lower value than the pulsation of reformate obtained in a fuel reformer of the comparative example. That is, the comparative example has a pulsation of about ±0.65 L/min. Also, in the case of the comparative example, the hydrogen generation amount is non-uniform (that is, about 5-6 cc/min) due to relatively large pulsation as compared to the case of the present embodiment.

With the aforementioned configuration, the inflow of the liquid-phase fuel or water from the evaporator to the reforming reactor can be blocked (or prevented). Therefore, the performance of the fuel reformer can be improved by reducing (or preventing) the non-uniform reforming reaction. Further, at the same output capacity, the length of a channel inside the apparatus can be shortened to ease the manufacturing of the apparatus and to reduce the volume of the apparatus. Also, the preparatory time of the apparatus can be shortened by reducing the volume of the apparatus.

To put it another way, a conventional evaporator for a fuel reformer may allow a liquid-phase fluid (e.g., water) to flow into a reforming reactor. As such, the performance of the reforming reactor is reduced due to a non-uniform reforming reaction caused by the liquid-phase fluid. As a solution to this problem, an existing evaporator is provided with a long channel to evaporate the liquid-phase fluid into a gas-phase fluid. However, the long channel increases the overall size of the evaporator and the time require to warm-up the evaporator.

By contrast, in view of the foregoing, an embodiment of the present invention provides a barrier within an evaporator to block discharge of a liquid-phase fluid into a reforming reactor without increasing the size of the evaporator. In one embodiment, the evaporator includes a circumferential wall and a bottom wall to define an evaporation chamber. The bottom wall has an outlet extending through the bottom wall, and a barrier surrounding the outlet and extending out from the bottom wall and into the evaporation chamber to block a liquid-phase fluid from being discharged through the outlet. Here, the barrier eliminates the need of a long channel while blocking the liquid-phase fluid to thereby increase the performance of a reforming reactor utilized with the evaporator without increasing the size of the evaporator.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An evaporator of a fuel reformer comprising:
   a circumferential wall including a top portion;
   a bottom wall having an outlet extending through the bottom wall;
   an evaporation chamber for receiving a liquid-phase fluid and defined by the circumferential wall and the bottom wall, the bottom wall being at a lower side of the evaporation chamber in a gravity direction;
   a barrier extending out from the bottom wall and into the evaporation chamber and for blocking the liquid-phase fluid from being discharged through the outlet while allowing a gas-phase fluid to be discharged through the outlet; and
   a heat source coupled to an outer surface of the bottom wall,
   wherein the barrier is at a periphery of the outlet,
   wherein the bottom wall is separated from the top portion of the circumferential wall by a first distance in a first direction, and
   wherein the barrier extends out of the bottom wall by a second distance in the first direction, the second distance being less than the first distance.

2. The evaporator of claim 1, wherein the second distance is between about 25% and about 75% of the first distance.

3. The evaporator of claim 1, wherein the evaporation chamber comprises a first-stage evaporation chamber and a second-stage evaporation chamber.

4. The evaporator of claim 3, further comprising a middle wall between the bottom wall and the circumferential wall, the middle wall separating the first-stage evaporation chamber from the second stage evaporation chamber and having a passage extending through the middle wall.

5. The evaporator of claim 4, further comprising another barrier extending from the middle wall and into the first-stage evaporation chamber.

6. The evaporator of claim 4, wherein:
   the bottom wall is separated from the middle wall by a first distance in a first direction, and
   the barrier extends out of the bottom wall by a second distance in the first direction, the second distance being less than the first distance.

7. The evaporator of claim 3, wherein the heat source is configured to supply heat to vaporize fluid in at least one of the first-stage evaporation chamber or the second-stage evaporation chamber.

8. The evaporator of claim 1, wherein the barrier is composed of an identical material as that of the bottom wall.

9. The evaporator of claim 1, wherein the barrier is composed of a different material from that of the bottom wall.

10. The evaporator of claim 1, wherein the barrier is a liquid blocking sill for blocking the liquid-phase fluid from flowing from a first region of the bottom wall to a second region of the bottom wall, the outlet being at the second region of the bottom wall.

11. The evaporator of claim 1, wherein the barrier is a pipe penetrated into the outlet and extending out from the bottom wall toward the circumferential wall.

12. The evaporator of claim 11, further comprising a mesh at an input or output end of the pipe.

13. The evaporator of claim 12, wherein the mesh has a mesh size between about 200 cells per square inch (cpsi) and about 1000 cpsi.

* * * * *